United States Patent
Iida (10) Patent No.: US 10,133,940 B2
(45) Date of Patent: Nov. 20, 2018

(54) ROAD SURFACE UNDULATION ESTIMATION DEVICE AND ROAD SURFACE UNDULATION ESTIMATION METHOD

(71) Applicant: Mitsubishi Electric Corporation, Tokyo (JP)

(72) Inventor: Koji Iida, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/205,189

(22) Filed: Jul. 8, 2016

(65) Prior Publication Data

US 2017/0206425 A1  Jul. 20, 2017

(30) Foreign Application Priority Data

Jan. 19, 2016  (JP) .................................. 2016-007733

(51) Int. Cl.
  *G06K 9/00*  (2006.01)
  *B60W 40/06*  (2012.01)
  *G06T 7/73*  (2017.01)

(52) U.S. Cl.
  CPC ......... *G06K 9/00798* (2013.01); *B60W 40/06* (2013.01); *G06K 9/00791* (2013.01); *G06T 7/73* (2017.01); *B60W 2420/42* (2013.01); *G06T 2207/30252* (2013.01); *G06T 2207/30256* (2013.01)

(58) Field of Classification Search
  None
  See application file for complete search history.

(56) References Cited

U.S. PATENT DOCUMENTS

| 2014/0072173 A1* | 3/2014 | Haas | G06T 7/74 |
| | | | 382/103 |
| 2016/0125612 A1* | 5/2016 | Seki | G06T 3/0018 |
| | | | 382/106 |
| 2016/0259338 A1* | 9/2016 | Nakamura | B60W 30/12 |

FOREIGN PATENT DOCUMENTS

JP        2013-238497 A1    11/2013

OTHER PUBLICATIONS

Wedel ("B-Spline Modeling of Road Surfaces With an Application to Free-Space Estimation", IEEE Transactions on Intelligent Transportation Systems, vol. 10, No. 4, Dec. 2009, pp. 572-583).*

* cited by examiner

*Primary Examiner* — Weiwen Yang
(74) *Attorney, Agent, or Firm* — Sughrue Mion, PLLC; Richard C. Turner (57) ABSTRACT

Provided is a road surface undulation estimation device and a road surface undulation estimation method capable of estimating an undulation of a road surface on which a vehicle travels, being configured to: detect regularly appearing objects from a vehicle periphery image captured by a camera; calculate detection positions of the respective regularly appearing objects by using camera installation information to transform positions of the respective regularly appearing objects in the vehicle periphery image into positions in a real space; calculate detection intervals between neighboring detection positions out of the respective detection positions; and estimate, from the respective detection positions, the calculated detection intervals, and an installation interval of the regularly appearing objects, inclinations of the actual road surface with respect to a road surface obtained through the transformation calculation from the vehicle periphery image to the real space.

7 Claims, 10 Drawing Sheets

ROAD SURFACE UNDULATION ESTIMATION DEVICE AND ROAD SURFACE UNDULATION ESTIMATION METHOD

BACKGROUND OF THE INVENTION

1. Field of the Invention

The present invention relates to a road surface undulation estimation device and a road surface undulation estimation method for estimating an undulation of a road surface on which a vehicle travels.

2. Description of the Related Art

In recent years, there have been increasingly proposed preventive security systems, which are configured to use sensors installed on a vehicle to detect objects in a periphery of the vehicle, thereby avoiding a danger in advance. In this system, the position of the object needs to be acquired highly precisely.

On this occasion, when a camera is used as a device for sensing the periphery of the vehicle, in order to highly precisely calculate the position of the object, it is important to accurately calibrate an installation state of an in-vehicle camera on the vehicle, namely, an installation angle of the in-vehicle camera with respect to a road surface.

In general, when the in-vehicle camera is calibrated before the shipment, at a location where the road surface is horizontal or the inclination of the road surface is constant, an installation angle of the in-vehicle camera with respect to the road surface is acquired in advance on the assumption that the road surface is a horizontal surface. During vehicle travel, an object on the road surface appearing in a camera image captured by the in-vehicle camera is detected, and a position of the object in the image is acquired. Then, the position of the object in the real space is acquired from the position of the object in the image based on the installation angle of the in-vehicle camera acquired in advance.

In the method described above, it is assumed that the installation angle of the in-vehicle camera acquired in advance and an installation angle of the in-vehicle camera with respect to a road surface on which the vehicle is travelling match each other. However, an undulation exists on the road surface on which the vehicle travels in the real environment, and thus the road surface is not always a horizontal surface. Further, depending on the travel location of the vehicle, the undulation of the road surface dynamically changes. Therefore, in practice, the installation angle of the in-vehicle camera acquired in advance and the installation angle of the in-vehicle camera with respect to the road surface on which the vehicle is travelling do not always match each other. Thus, if the position of the object in the real space is acquired on the above-mentioned assumption, there is a problem in that precision of detecting the position of the object may decrease.

Thus, the road surface on which the vehicle travels has the undulation in the real environment, and hence a technology for estimating the undulation of the road surface on which the vehicle travels is necessary. As an example of coping with the above-mentioned problem, there is proposed an in-vehicle camera automatic calibration device (for example, refer to Japanese Patent Application Laid-open No. 2013-238497) configured to calibrate the installation angle of the in-vehicle camera with respect to the road surface in real time during the travel of the vehicle with use of motion information on an object existing on the road surface, but the device is not configured to estimate the undulation of the road surface on which the vehicle travels.

As described above, the road surface on which the vehicle travels has the undulation in the real environment, and hence a technology for estimating the undulation of the road surface on which the vehicle travels is necessary.

SUMMARY OF THE INVENTION

The present invention has been made in view of the above-mentioned problem, and therefore has an object to provide a road surface undulation estimation device and a road surface undulation estimation method capable of estimating an undulation of a road surface on which a vehicle travels.

According to one embodiment of the present invention, there is provided a road surface undulation estimation device, which is configured to input a vehicle periphery image captured by a camera, the camera being installed on a vehicle traveling on a road surface so as to be capable of capturing an image of a periphery of the vehicle, the road surface undulation estimation device including: a storage unit configured to store camera installation information acquired in advance; an object detection unit configured to detect regularly appearing objects installed at a constant installation interval on the road surface from the vehicle periphery image captured by the camera, calculate positions of the respective detected regularly appearing objects in the vehicle periphery image, and output a calculation result as position information; a position transformation unit configured to transform, based on the position information input from the object detection unit and the camera installation information acquired from the storage unit, the positions of the respective regularly appearing objects in the vehicle periphery image into positions of the respective regularly appearing objects in a real space, and output a transformation result as detection positions of the respective regularly appearing objects; and a road surface estimation unit configured to calculate respective detection intervals between neighboring detection positions out of the respective detection positions input from the position transformation unit, and estimate, from the respective detection positions, the respective calculated detection intervals, and the constant installation interval of the regularly appearing objects, inclinations of an actual road surface with respect to a road surface obtained through the transformation calculation by the position transformation unit.

Further, according to one embodiment of the present invention, there is provided a road surface undulation estimation method for estimating an undulation of a road surface through use of a vehicle periphery image captured by a camera, the camera being installed on a vehicle traveling on the road surface so as to be capable of capturing an image of a periphery of the vehicle, the road surface undulation estimation method including: an object detection step of detecting regularly appearing objects installed at a constant installation interval on the road surface from the vehicle periphery image captured by the camera, calculating positions of the respective detected regularly appearing objects in the vehicle periphery image, and outputting a calculation result as position information; a position transformation step of transforming, based on the position information output in the object detection step and camera installation information acquired in advance, the positions of the respective regularly appearing objects in the vehicle periphery image into positions of the respective regularly appearing objects in a real space, and outputting a transformation result as detection positions of the respective regularly appearing objects; and a road surface estimation step of calculating respective detection intervals between neighboring detection positions out of the respective detection positions output in the position transformation step, and estimating, from the respective detection positions, the respective calculated detection intervals, and the constant installation interval of the regularly appearing objects, inclinations of an actual road surface with respect to a road surface obtained through the transformation calculation in the position transformation step.

According to the present invention, the configuration is made to detect the regularly appearing objects from the vehicle periphery image captured by the camera, calculate the detection positions of the respective regularly appearing objects by using the camera installation information to transform the positions of the respective regularly appearing objects in the image into the positions in the real space, calculate the detection intervals between the neighboring detection positions out of the respective detection positions, and estimate, from the respective detection positions, the calculated detection intervals, and the installation interval of the regularly appearing objects, the inclinations of the actual road surface with respect to the road surface obtained through the transformation calculation from the image to the real space. As a result, the road surface undulation estimation device and the road surface undulation estimation method capable of estimating the undulation of the road surface on which the vehicle travels can be acquired.

DETAILED DESCRIPTION OF THE PREFERRED EMBODIMENTS

Now, a road surface undulation estimation device and a road surface undulation estimation method according to exemplary embodiments of the present invention are described referring to the accompanying drawings. In the illustration of the drawings, the same or corresponding components are denoted by the same reference symbols, and the overlapping description thereof is herein omitted.

First Embodiment

Figure 1:
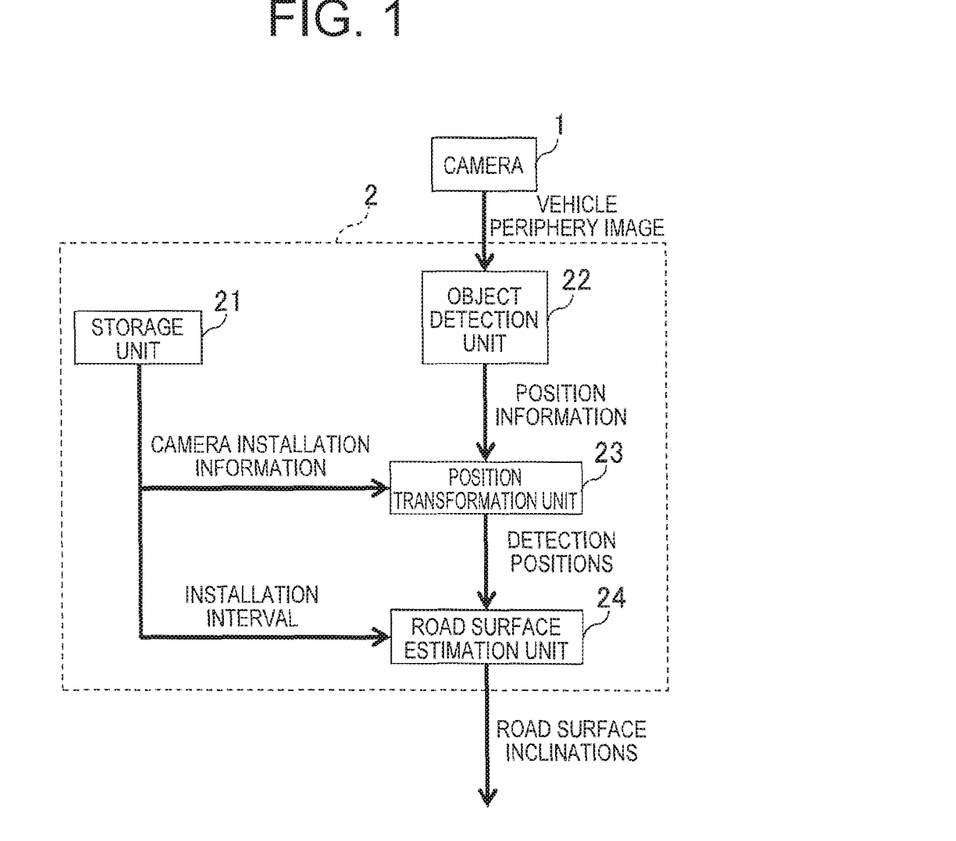
FIG. 1 is a configuration diagram for illustrating a road surface undulation estimation device according to a first embodiment of the present invention.

FIG. 1 is a configuration diagram for illustrating a road surface undulation estimation device 2 according to a first embodiment of the present invention. In FIG. 1, a camera 1 configured to input a capturing result to the road surface undulation estimation device 2 is also illustrated. The road surface undulation estimation device 2 is configured to use objects (hereinafter referred to as regularly appearing objects) regularly arranged on a road surface at a constant installation interval to estimate the undulation of the road surface.

In FIG. 1, the camera 1 is installed on a vehicle traveling on the road surface so as to be capable of capturing a periphery of the vehicle, and is constructed, for example, by a monocular camera. The camera 1 is configured to capturing an image of the periphery of the vehicle, and output a result of the capturing as a vehicle periphery image to the road surface undulation estimation device 2.

The road surface undulation estimation device 2 includes a storage unit 21, an object detection unit 22, a position transformation unit 23, and a road surface estimation unit 24. The road surface undulation estimation device 2 is realized, for example, by a CPU for executing programs stored in a memory, and a processing circuit, e.g., a system LSI.

The storage unit 21 is constructed, for example, by a memory, and the storage unit 21 is configured to store the installation information on the camera 1 and an installation interval of the regularly appearing objects installed on the road surface.

The installation information (hereinafter referred to as camera installation information) on the camera 1 includes an installation angle of the camera 1 with respect to the road surface and a height of the camera 1 with respect to the road surface, and is acquired in advance. The installation angle of the camera 1 is acquired in advance, and is an angle representing a position relationship of the camera 1 with respect to the road surface on the assumption that the road surface is a horizontal plane. In general, when the camera 1 is calibrated before the shipment, at a location where the road surface is horizontal or the inclination of the road surface is constant, the installation angle of the camera 1 with respect to the road surface is acquired in advance. Similarly, the height of the camera 1 with respect to the road surface is acquired in advance.

In the first embodiment, regularly appearing objects whose installation interval is regulated by a law or the like are used as the objects. Examples of those regularly appearing objects include a line portion of a lane line (hereinafter referred to as broken lane line) whose line type is a broken line, and a delineator. In this way, it is assumed that the installation interval of the regularly appearing objects is regulated by a law or the like, and thus the installation interval of the regularly appearing objects can be acquired in advance, and is known. In other words, the road surface undulation estimation device 2 according to the first embodiment is configured to use the regularly appearing objects installed at the known installation interval to estimate the undulation of the road surface.

The object detection unit 22 is configured to detect the regularly appearing objects from the vehicle periphery image captured by the camera 1, and calculate a position of each of the detected regularly appearing objects in the image, more specifically, position coordinates of each of the regularly appearing objects in the image. Moreover, the object detection unit 22 is configured to output a calculation result, namely, the calculated positions of the respective regularly appearing objects in the image, to the position transformation unit 23 as position information.

The position transformation unit 23 is configured to apply a known technology to the position information input from the object detection unit 22 and the camera installation information acquired from the storage unit 21, thereby transforming the positions of the respective regularly appearing objects in the image into positions (hereinafter referred to as detection positions) of the respective regularly appearing objects in the real space. Moreover, the position transformation unit 23 is configured to output the detection positions of the respective regularly appearing objects to the road surface estimation unit 24.

The road surface estimation unit 24 is configured to calculate intervals (hereinafter referred to as detection intervals) between neighboring detection positions out of the detection positions of the regularly appearing objects input from the position transformation unit 23. Moreover, the road surface estimation unit is configured to estimate, from the respective detection positions input from the position transformation unit 23, the calculated detection intervals, and the installation interval of the regularly appearing objects input from the storage unit 21, the undulation of the road surface, namely, inclinations of the road surface, and output an estimation result.

On this occasion, the inclination of the road surface means an inclination of an actual road surface with respect to the road surface obtained through the transformation calculation by the position transformation unit 23, more specifically, an index representing, in the angle, how much the actual road surface inclines with respect to the road surface obtained through the transformation calculation.

Figure 2:
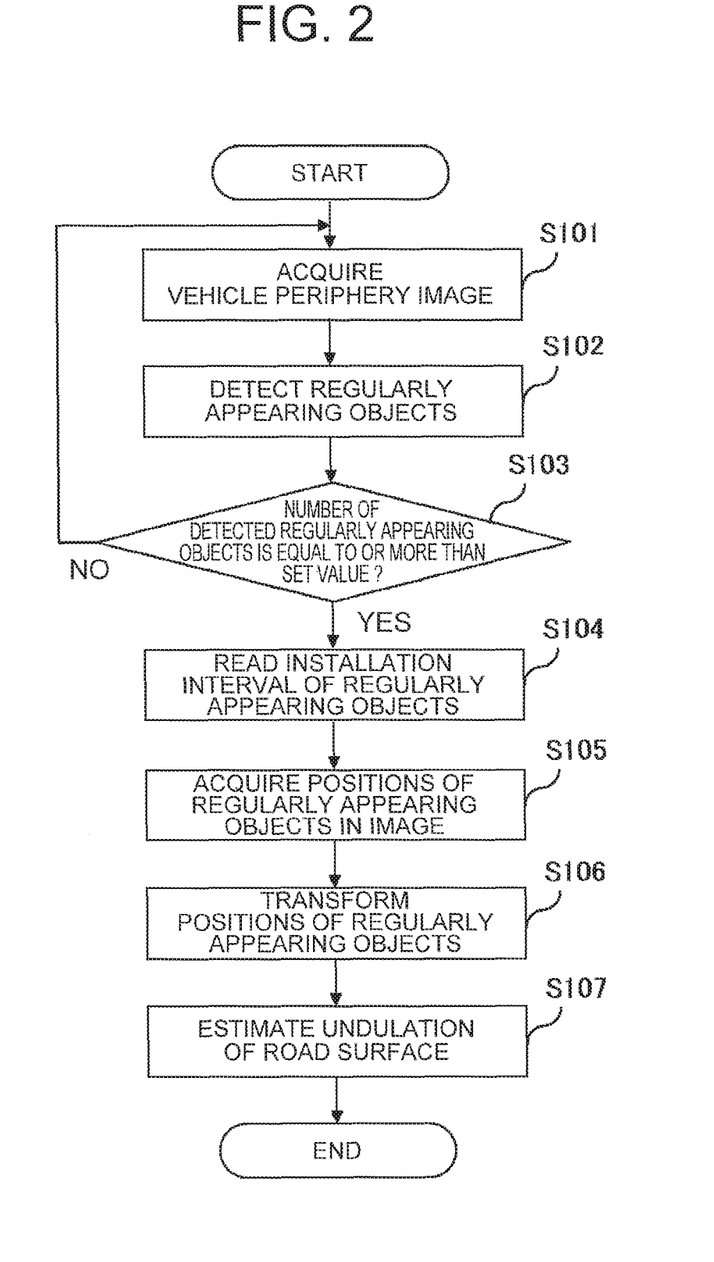
FIG. 2 is a flowchart for illustrating a series of operations of the road surface undulation estimation device of FIG. 1.
Figure 3:
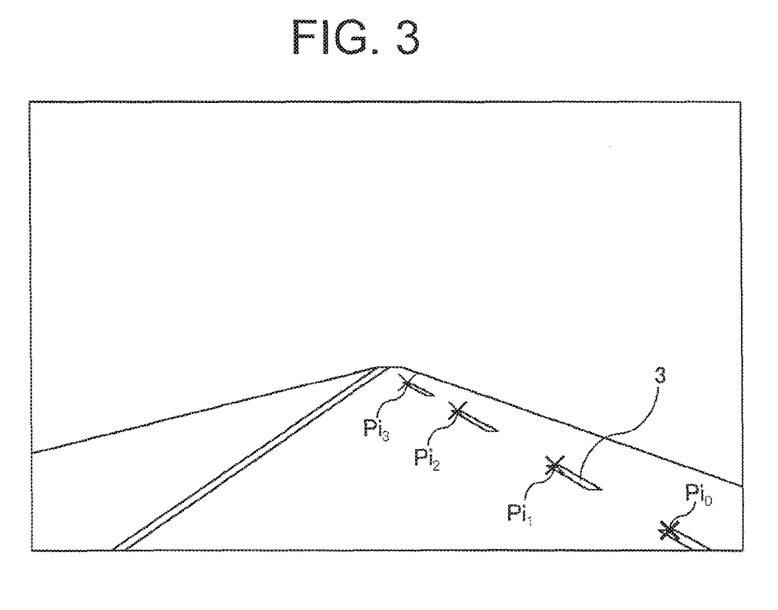
FIG. 3 is an explanatory diagram for illustrating an example of an operation of an object detection unit of FIG. 1 of detecting respective regularly appearing objects from a vehicle periphery image.

Referring to FIG. 2 and FIG. 3, a description is now given of a series of operations of the road surface undulation estimation device 2 according to the first embodiment. FIG. 2 is a flowchart for illustrating the series of operations of the road surface undulation estimation device 2 of FIG. 1. FIG. 3 is an explanatory diagram for illustrating an example of an operation of the object detection unit 22 of FIG. 1 of detecting the respective regularly appearing objects from the vehicle periphery image.

Processing of the flowchart of FIG. 2 is repeatedly carried out, for example, at a processing cycle set in advance. Moreover, it is assumed here that the regularly appearing object is a line portion 3 of a broken lane line. In this case, the object detection unit 22 is set to detect the position of an edge of one of the line portions 3, namely, the position of an edge on a farther side of the line portion 3 in the vehicle periphery image, as the position of the line portion 3 in the image.

As illustrated in FIG. 2, in Step S101, the object detection unit 22 acquires the vehicle periphery image from the camera 1, and the processing proceeds to Step S102.

In Step S102, the object detection unit 22 detects the regularly appearing objects from the vehicle periphery image captured by the camera 1, and the processing proceeds to Step S103.

In Step S103, the object detection unit 22 determines whether or not the number k of the detected regularly appearing objects is equal to or more than a set value. The set value only needs to be set in advance to a value equal to or more than 2. In Step S103, when the object detection unit 22 determines that the number k of the regularly appearing objects is equal to or more than the set value, the processing proceeds to Step S104. On the other hand, when the object detection unit 22 determines that the number k of the regularly appearing objects is less than the set value, the processing returns to Step S101.

In Step S104, the road surface estimation unit 24 reads and acquires an installation interval b of the regularly appearing objects stored in the storage unit 21, and the processing proceeds to Step S105. In Step S105, the object detection unit 22 acquires positions $Pi_0, Pi_1, \ldots, Pi_{k-1}$ of the respective detected regularly appearing objects in the image, and the processing proceeds to Step S106.

In Step S106, the position transformation unit 23 transforms, based on the camera installation information acquired from the storage unit 21, the respective positions $Pi_0, Pi_1, \ldots, Pi_{k-1}$ of the respective regularly appearing objects input from the object detection unit 22 into detection positions $Pd_0, Pd_1, \ldots, Pd_{k-1}$ of the respective regularly appearing objects, and the processing proceeds to Step S107.

In Step S107, the road surface estimation unit 24 calculates, from the detection positions $Pd_0, Pd_1, \ldots, Pd_{k-1}$ of the respective regularly appearing objects input from the position transformation unit 23, detection intervals $a_0, a_1, \ldots, a_{k-2}$ of the respective regularly appearing objects. Subsequently, the road surface estimation unit 24 estimates inclinations $\theta_0, \theta_1, \ldots, \theta_{k-2}$ of the road surface from the detection positions $Pd_0, Pd_1, \ldots, Pd_{k-1}$ of the respective regularly appearing objects input from the position transformation unit 23, the calculated detection intervals $a_0, a_1, \ldots, a_{k-2}$ of the respective regularly appearing objects, and the installation interval b of the regularly appearing objects acquired from the storage unit 21. Then, the series of processing is finished.

Now, a case is considered in which the vehicle periphery image captured by the camera 1 presents a state illustrated in FIG. 3. In this case, k=4, and, in Step S105, the object detection unit 22 acquires the positions $Pi_0$ to $Pi_3$ of the respective line portions 3 in the image. In Step S106, the position transformation unit 23 transforms the positions $Pi_0$ to $Pi_3$ of the respective line portions 3 in the image into the detection positions $Pd_0$ to $Pd_3$ of the respective line portions 3. In Step S107, the road surface estimation unit 24 estimates the inclinations $\theta_0$ to $\theta_2$ of the road surface from the detection positions $Pd_0$ to $Pd_3$ of the respective line portions 3, the detection intervals $a_0$ to $a_2$ of the respective line portions 3, and the installation interval b.

Figure 4:
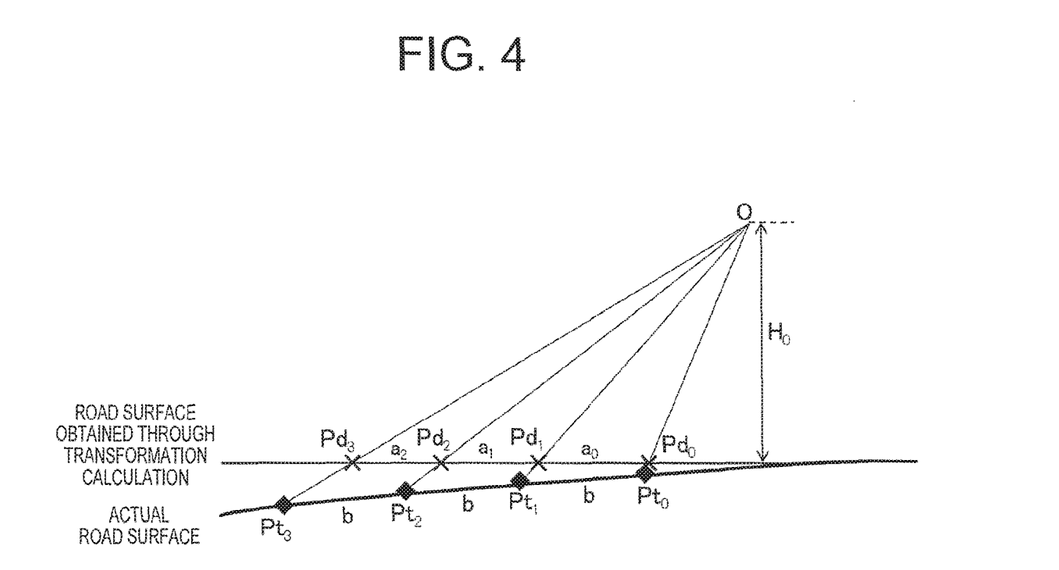
FIG. 4 is an explanatory diagram for illustrating a method of estimating inclinations of a road surface carried out by a road surface estimation unit of FIG. 1.

Referring to FIG. 4, a description is now given of a method of estimating the inclinations of the road surface carried out by the road surface estimation unit 24. FIG. 4 is an explanatory diagram for illustrating the method of estimating the inclinations of the road surface carried out by the road surface estimation unit 24 of FIG. 1. Note that, herein, a variable is represented by n, and satisfies a relationship of $0 \leq n \leq k-2$.

In FIG. 4, a position relationship between the detection positions $Pd_0$ to $Pd_3$ of the respective regularly appearing objects existing on the road surface obtained through the transformation calculation by the position transformation unit 23 and actual positions $Pt_0$ to $Pt_3$ of the respective regularly appearing objects existing on the actual road surface is illustrated. It is assumed that the actual positions $Pt_0$ to $Pt_3$ exist on respective straight lines passing through a lens center O of the camera 1 and the detection positions $Pd_0$ to $Pd_3$, and the actual positions $Pt_0$ to $Pt_3$ are arranged on a straight line at the known installation interval b.

A height $H_0$ of the lens center O from the road surface obtained through the transformation calculation is included in the camera installation information, and is thus known. Moreover, angles between the respective straight lines passing through the lens center O and the detection positions $Pd_0$ to $Pd_3$ and the road surface obtained through the transformation calculation can be acquired from position relationships between the lens center O and the detection positions $Pd_0$ to $Pd_3$.

In the above-mentioned estimation method, a portion between the actual positions $Pt_n$ and $Pt_{n+1}$ is approximated to a straight line, and an angle $\theta_n$ between the road surface obtained through the transformation calculation and the straight line $Pt_n Pt_{n+1}$ is calculated as the inclination $\theta_n$ of the road surface.

Figure 5:
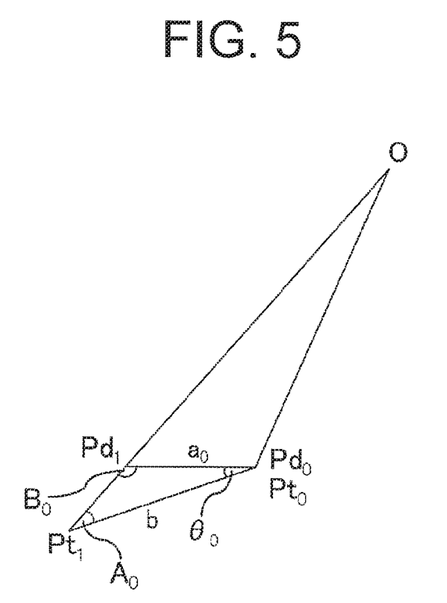
FIG. 5 is an explanatory diagram for illustrating a first calculation method of calculating an inclination $\theta_0$ of the road surface by the road surface estimation unit of FIG. 1.
Figure 6:
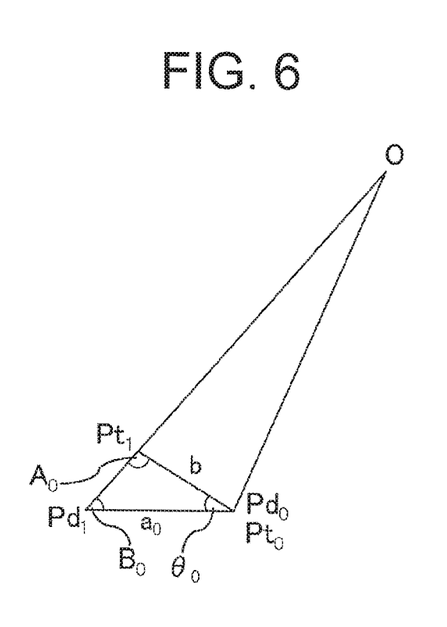
FIG. 6 is an explanatory diagram for illustrating a second calculation method of calculating the inclination $\theta_0$ of the road surface by the road surface estimation unit of FIG. 1.

Referring to FIG. 5 and FIG. 6, a description is now given of a method of calculating the inclination $\theta_0$ of the road surface. FIG. 5 is an explanatory diagram for illustrating a first calculation method of calculating the inclination $\theta_0$ of the road surface by the road surface estimation unit 24 of FIG. 1. FIG. 6 is an explanatory diagram for illustrating a second calculation method of calculating the inclination $\theta_0$ of the road surface by the road surface estimation unit 24 of FIG. 1.

As an assumption for the calculation of the inclination $\theta_0$ of the road surface, the detection position $Pd_0$ is a detection position shortest in the distance from the lens center O. Thus, it is assumed that the detection position $Pd_0$ and the actual position $Pt_0$ are approximately equal to each other, and thus, as illustrated in FIG. 5 and FIG. 6, $Pd_0 = Pt_0$.

In FIG. 5, the first calculation method of calculating the inclination $\theta_0$ of the road surface when $a_0 < b$, that is, the actual road surface inclines downward with respect to the road surface obtained through the transformation calculation, is illustrated. Moreover, in FIG. 5, in a triangle $Pt_0 Pt_1 Pd_1$, $\angle Pd_1 Pt_0 Pt_1$, namely, an angle between a straight line $Pt_0 Pt_1$ and a straight line $Pd_0 Pd_1$, is denoted by $\theta_0$; $\angle Pt_0 Pt_1 Pd_1$, $A_0$; and $\angle Pt_0 Pd_1 Pt_1$, $B_0$.

In the triangle $Pt_0 Pt_1 Pd_1$, according to the sine law, Equation (1) is established, and Equation (1) is transformed into Equation (2). Moreover, in the triangle $Pt_0 Pt_1 Pd_1$, Equation (3) is established.

$$b/\sin B_0 = a_0/\sin A_0 \quad (1)$$

$$\sin A_0 = a_0 \sin B_0/b \quad (2)$$

$$\theta_0 = \pi - (A_0 + B_0) \quad (3)$$

In this case, respective values of $a_0$ and b are known. Moreover, $\angle OPd_1 Pd_0$, namely, an angle between the straight line from the lens center O to the detection position $Pd_1$ and the road surface obtained through the transformation calculation, is known, and the value of $B_0$ is thus determined.

Further, $0 < A_0 < \pi/2$ is satisfied. Therefore, based on Equation (2), the value of $A_0$ is uniquely determined. When the value of $A_0$ is determined in this way, the value of $\theta_0$ is determined based on Equation (3).

In FIG. 6, the second calculation method of calculating the inclination $\theta_0$ of the road surface when $a_0 > b$, that is, the actual road surface inclines upward with respect to the road surface obtained through the transformation calculation, is illustrated.

In FIG. 6, as in FIG. 5, Equation (1) to Equation (3) are established, the value of $B_0$ is determined, and $\pi/2 < A_0 < \pi$ is satisfied. Thus, as in the description given above, based on Equation (2), the value of $A_0$ is uniquely determined. As a result, based on Equation (3), the value of $\theta_0$ is determined.

Figure 7:
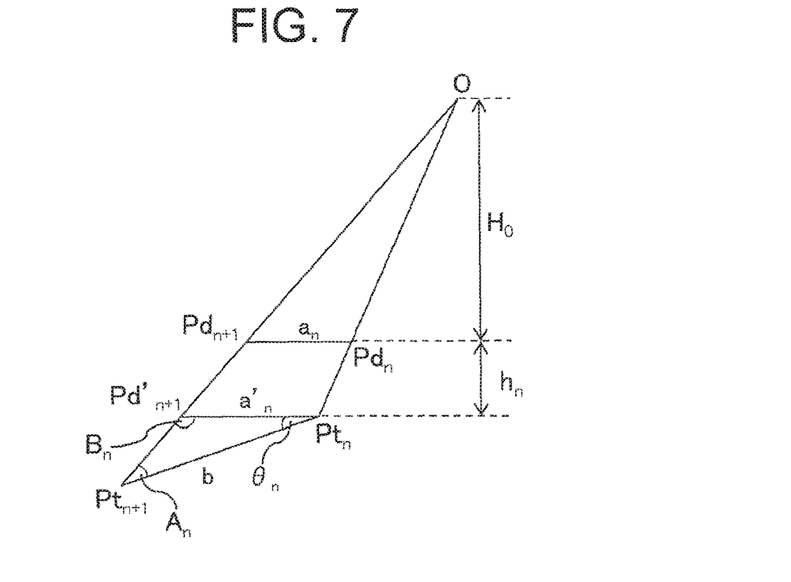
FIG. 7 is an explanatory diagram for illustrating a method of calculating an inclination $\theta_n$ (where n≥1) of the road surface by the road surface estimation unit of FIG. 1.

Referring to FIG. 7, a description is now given of a method of calculating the inclination $\theta_n$ (where $n \geq 1$) of the road surface. FIG. 7 is an explanatory diagram for illustrating a method of calculating the inclination $\theta_n$ (where $n \geq 1$) of the road surface by the road surface estimation unit 24 of FIG. 1.

In FIG. 7, a straight line parallel with a straight line $Pd_n Pd_{n+1}$ is drawn from the actual position $Pt_n$. Then, an intersection between this straight line and a straight line $OPt_{n+1}$ is denoted by $Pd'_{n+1}$, and the length of a straight line $Pt_n Pd'_{n+1}$ is denoted by $a'_n$. In a triangle $Pt_n Pt_{n+1} Pd'_{n+1}$, $\angle Pd'_{n+1} Pt_n Pt_{n+1}$, namely, an angle between the straight line $Pt_n Pt_{n+1}$ and a straight line $Pt_n Pd'_{n+1}$, is considered as the inclination $\theta_n$ of the road surface. Moreover, $\angle Pd'_{n+1} Pt_{n+1} Pt_n$ is denoted by $A_n$, and $\angle Pt_{n+1} Pd'_{n+1} Pt_n$ is denoted by $B_n$. The height of a triangle $OPd_n Pd_{n+1}$ is denoted by $H_0$, and the height of a triangle $OPd'_{n+1} Pt_n$ is denoted by $H_0 + h_n$.

On this occasion, a relationship between $h_n$ and $h_{n-1}$ satisfies Equation (4), and a relationship between $a_n$ and $a'_n$ satisfies Equation (5).

$$h_n = h_{n-1} + b \sin \theta_{n-1} \quad (4)$$

$$a'_n : a_n = (H_0 + h_n) : H_0 \quad (5)$$

Moreover, from Equations (4) and (5), Equation (6) can be derived.

$$a'_n = a_n(H_0 + h_{n-1} + b \sin \theta_{n-1})/H_0 \quad (6)$$

In the triangle $Pt_n Pt_{n+1} Pd'_{n+1}$, $a'_n$ is determined based on Equation (6), and the value of b is known. Moreover, $\angle OPd_{n+1} Pd_n$, namely, an angle between the straight line from the lens center O to the detection position $Pd_{n+1}$ and the road surface obtained through the transformation calculation, is known, and the value of $B_n$ is thus determined. Thus, through calculation similar to the calculation method illustrated in FIG. 5 and FIG. 6, the value of $\theta_n$ is determined.

In this way, the road surface estimation unit 24 can use the calculation method illustrated in FIG. 5 to FIG. 7 to calculate the inclinations $\theta_0$ to $\theta_n$ of the road surface.

Thus, according to the first embodiment, the regularly appearing objects are detected from the vehicle periphery image captured by the camera, and the detection positions of the respective regularly appearing objects are calculated by using the camera installation information to transform the positions of the respective regularly appearing objects in the image into the positions in the real space. Further, the detection intervals between the neighboring detection positions out of the respective detection positions are calculated, and from the respective detection positions, the calculated detection intervals, and the installation interval of the regularly appearing objects, the inclinations of the actual road surface with respect to the road surface obtained through the transformation calculation from the image to the real space are estimated.

With this configuration, without using sensors other than the camera, the undulation of the road surface of the vehicle periphery can be calculated from the image taken by the camera. As a result, the undulation of the road surface on which the vehicle travels can be estimated.

Moreover, in the first embodiment, the regularly appearing objects installed at the known installation interval are used, and the installation interval of the regularly appearing objects is used to estimate the inclination of the road surface. Thus, compared with a case in which the installation interval is calculated as in second and third embodiments of the present invention described later, a processing load imposed by the calculation of the road surface undulation can be reduced.

Second Embodiment

According to the second embodiment of the present invention, in contrast to the first embodiment, a description is given of the road surface estimation device 2 configured to use regularly appearing objects each on which a numerical value representing a distance is displayed to calculate the installation interval of the regularly appearing objects. Note that, according to the second embodiment, a description is omitted for points the same as the first embodiment, and is mainly given of points different from the first embodiment.

On this occasion, in the first embodiment, the regularly appearing object whose installation interval is regulated by a law or the like is used as the object, and the installation interval of the regularly appearing objects is known. In contrast, in the second embodiment, the regularly appearing object on which a numerical value representing a distance is displayed is used as the object, and the numerical value displayed on the regularly appearing object is used to calculate the installation interval of the regularly appearing objects.

Examples of the regularly appearing object on which the numerical value representing a distance is displayed include an inter-vehicle distance display board installed at an equal interval for a driver to recognize a distance between the own vehicle and a preceding vehicle, and a display board installed on an expressway, and indicating a distance of the present location from a location of a start point.

Figure 8:
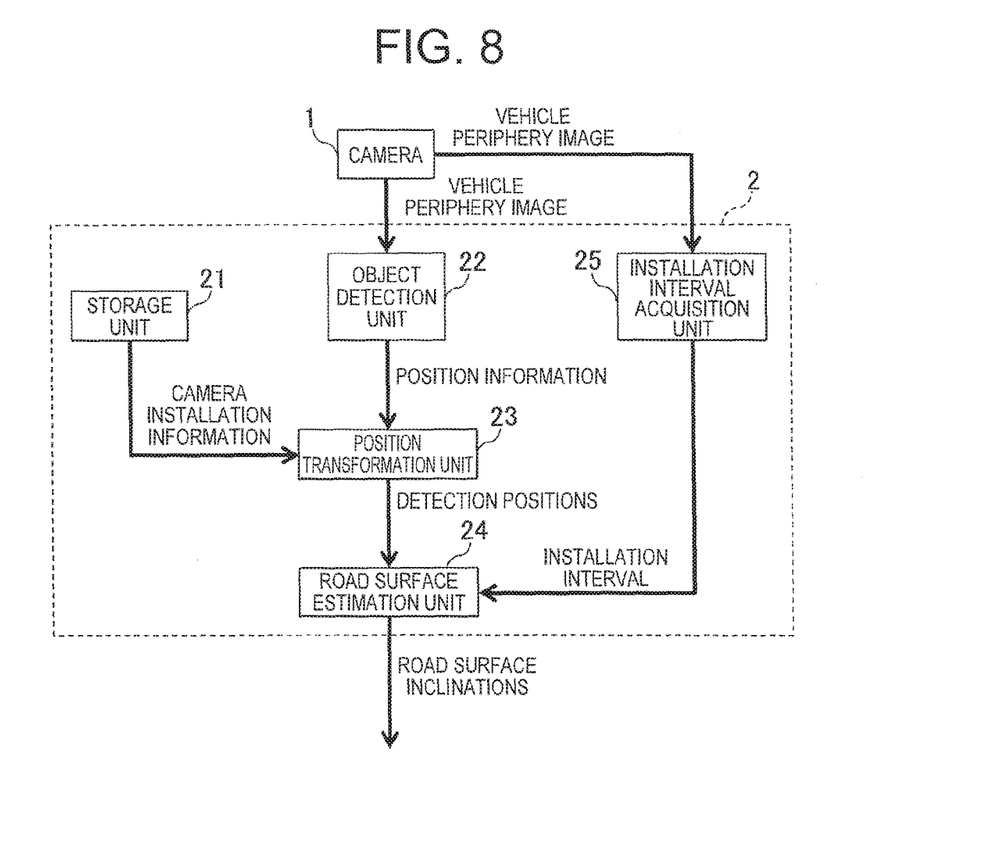
FIG. 8 is a configuration diagram for illustrating a road surface undulation estimation device according to a second embodiment of the present invention.

FIG. 8 is a configuration diagram for illustrating the road surface undulation estimation device 2 according to the second embodiment of the present invention. In FIG. 8, the road surface undulation estimation device 2 includes the storage unit 21, the object detection unit 22, the position transformation unit 23, the road surface estimation unit 24, and an installation interval acquisition unit 25.

The installation interval acquisition unit 25 is configured to recognize the numerical values displayed on the regularly appearing objects in the vehicle periphery image input from the camera 1, thereby calculating the installation interval of the regularly appearing objects. The installation interval acquisition unit 25 is configured to output the installation interval acquired through the calculation to the road surface estimation unit 24. The road surface estimation unit 24 uses the installation interval input from the installation interval acquisition unit 25 to estimate the inclination of the road surface, which is different from the first embodiment.

Figure 9:
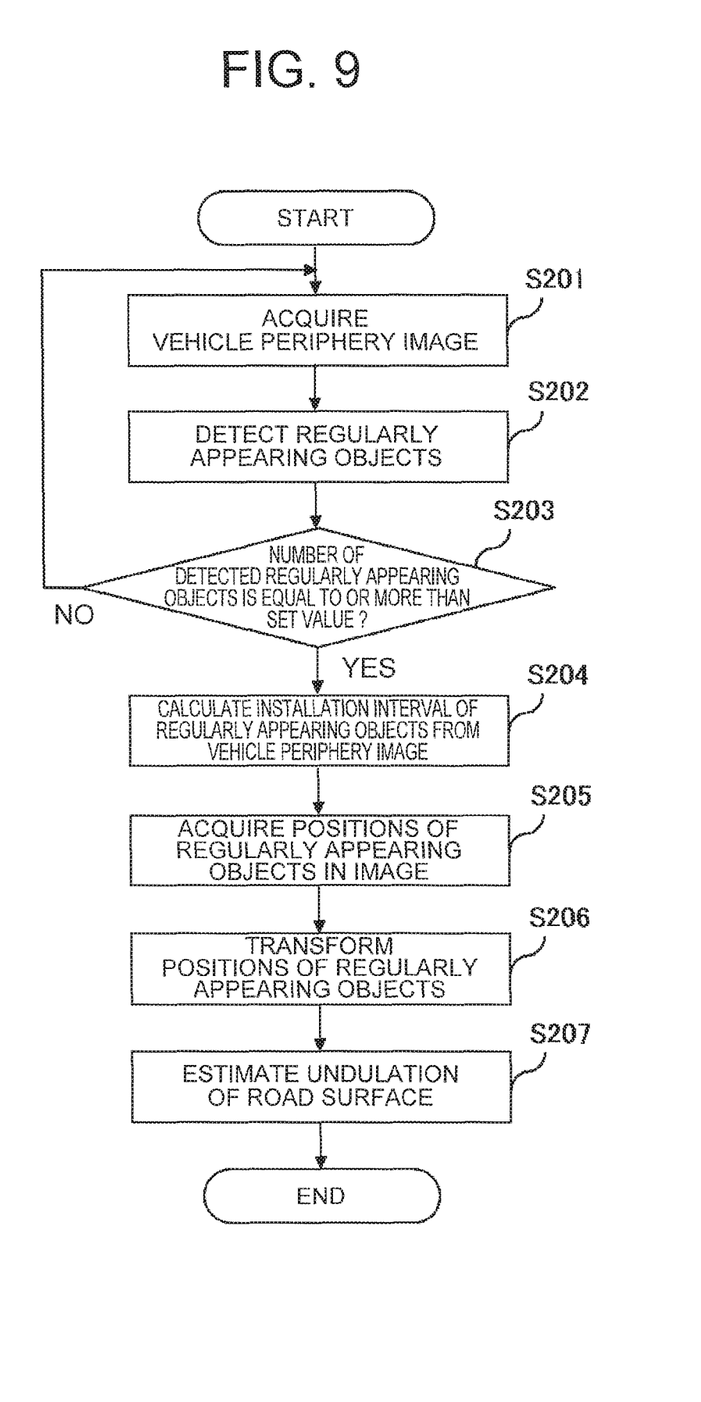
FIG. 9 is a flowchart for illustrating a series of operations of the road surface undulation estimation device of FIG. 8.
Figure 10:
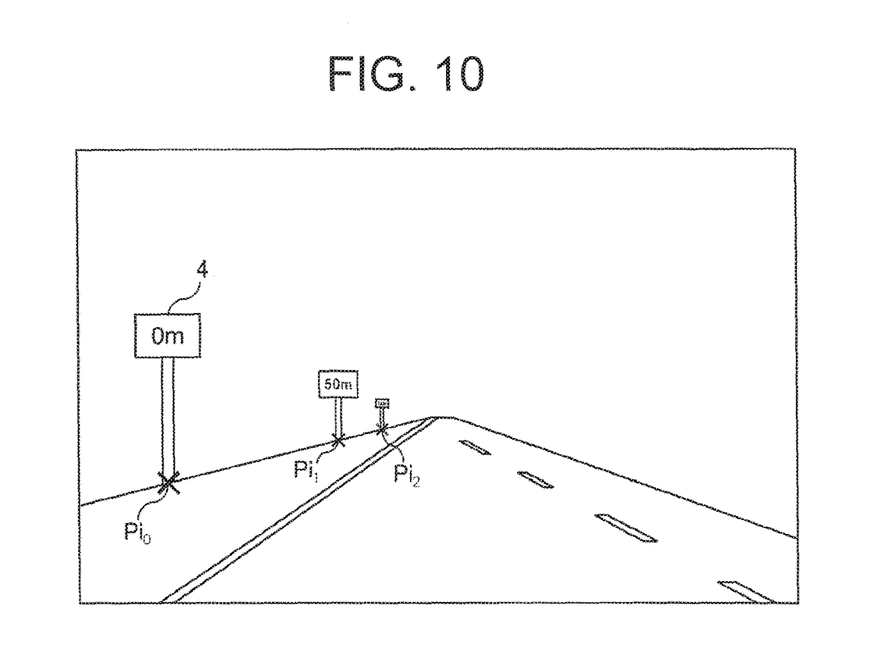
FIG. 10 is an explanatory diagram for illustrating an example of an operation of the object detection unit of FIG. 8 of detecting respective regularly appearing objects from a vehicle periphery image.

Referring to FIG. 9 and FIG. 10, a description is now given of a series of operations of the road surface undulation estimation device 2 according to the second embodiment.

FIG. 9 is a flowchart for illustrating the series of operations of the road surface undulation estimation device 2 of FIG. 8. FIG. 10 is an explanatory diagram for illustrating an example of an operation of the object detection unit 22 of FIG. 8 of detecting the respective regularly appearing objects from the vehicle periphery image.

Processing of the flowchart of FIG. 9 is repeatedly carried out, for example, at a processing cycle set in advance. Moreover, it is assumed here that the regularly appearing object is an inter-vehicle distance display board 4. In this case, the object detection unit 22 is set to detect a position at which each inter-vehicle distance display board 4 and the road surface contact with each other as the position of each inter-vehicle distance display board 4 in the image.

As illustrated in FIG. 9, in Step S201, the object detection unit 22 and the installation interval acquisition unit 25 acquire the vehicle periphery image from the camera 1, and the processing proceeds to Step S202.

The object detection unit 22 carries out Steps S202 and S203, which are the same processing as Steps S102 and S103 of FIG. 2.

In Step S204, the installation interval acquisition unit 25 recognizes the numerical values displayed on the regularly appearing objects from the vehicle periphery image captured by the camera 1, thereby calculating the installation interval b of the regularly appearing objects, and the processing proceeds to Step S205.

The object detection unit 22 carries out Step S205, which is the same processing as Step S105, and the processing proceeds to Step S206.

The position transformation unit 23 carries out Step S206, which is the same processing as Step S106 of FIG. 2, and the processing proceeds to Step S207.

In Step S207, the road surface estimation unit 24 calculates, from the detection positions $Pd_0, Pd_1, \ldots, Pd_{k-1}$ of the respective regularly appearing objects input from the position transformation unit 23, the detection intervals $a_0, a_1, \ldots, a_{k-2}$ of the respective regularly appearing objects. Subsequently, the road surface estimation unit 24 estimates the inclinations $\theta_0, \theta_1, \ldots, \theta_{k-2}$ of the road surface from the detection positions $Pd_0, Pd_1, \ldots, Pd_{k-1}$ of the respective regularly appearing objects input from the position transformation unit 23, the calculated detection intervals $a_0, a_1, \ldots, a_{k-2}$ of the respective regularly appearing objects, and the installation interval b acquired from the installation interval acquisition unit 25. Then, the series of processing is finished. The road surface estimation unit 24 calculates the inclinations $\theta_0$ to $\theta_{k-2}$ of the road surface through the calculation method described in the first embodiment, that is, the calculation method illustrated in FIG. 5 to FIG. 7.

Now, a case is considered in which the vehicle periphery image captured by the camera 1 presents a state illustrated in FIG. 10. In this case, k is 3, and, in Step S204, the installation interval acquisition unit 25 recognizes, from the vehicle periphery image captured by the camera 1, numerical values displayed on the respective inter-vehicle distance display boards 4, namely, 0 m, 50 m, and 100 m, thereby calculating the installation interval b, and recognizing the interval b as 50 m. In Step S205, the object detection unit 22 acquires the positions $Pi_0$ to $Pi_2$ of the respective inter-vehicle distance display boards 4 in the image.

In Step S206, the position transformation unit 23 transforms the positions $Pi_0$ to $Pi_2$ of the respective inter-vehicle distance display boards 4 in the image into the detection positions $Pd_0$ to $Pd_2$ of the respective inter-vehicle distance display boards 4. In Step S207, the road surface estimation unit 24 estimates the inclinations $\theta_0$ and $\theta_1$ of the road surface from the detection positions $Pd_0$ to $Pd_2$ of the respective inter-vehicle distance display boards 4, the detection intervals $a_0$ and $a_1$ of the respective inter-vehicle distance display boards 4, and the installation interval b (=50 m).

Thus, according to the second embodiment, the regularly appearing objects each displaying the numerical value indicating the distance are used, the regularly appearing objects are detected from the vehicle periphery image captured by the camera, the numerical values displayed on the respective detected regularly appearing objects are recognized, thereby calculating the installation interval, and the calculated installation interval is used to estimate the inclinations of the road surface.

As a result, the same effects as those of the first embodiment are acquired, and even when the installation interval, which is known in the first embodiment, is not known, the undulation of the road surface can be estimated.

Third Embodiment

According to the third embodiment of the present invention, in contrast to the first embodiment, a description is given of the road surface estimation device 2 configured to use regularly appearing objects whose installation interval is unknown and that have a characteristic of appearing repeatedly to calculate the installation interval of the regularly appearing objects. Note that, according to the third embodiment, a description is omitted for points the same as the first and second embodiments, and is mainly given of points different from the first and second embodiments.

On this occasion, in the second embodiment, the regularly appearing object on which the numerical value indicating the distance is displayed is used as the object, and the installation interval of the regularly appearing objects is calculated from the numerical values. In contrast, in the third embodiment, the regularly appearing objects whose installation interval is unknown and that have the characteristic of appearing repeatedly are used as the object, and the characteristic is used to calculate the installation interval of the regularly appearing objects.

Examples of the regularly appearing objects whose installation interval is unknown and that have the characteristic of appearing repeatedly include a post of a guard rail, a post of a windbreak wall, and a post of a sand barrier fence.

Figure 11:
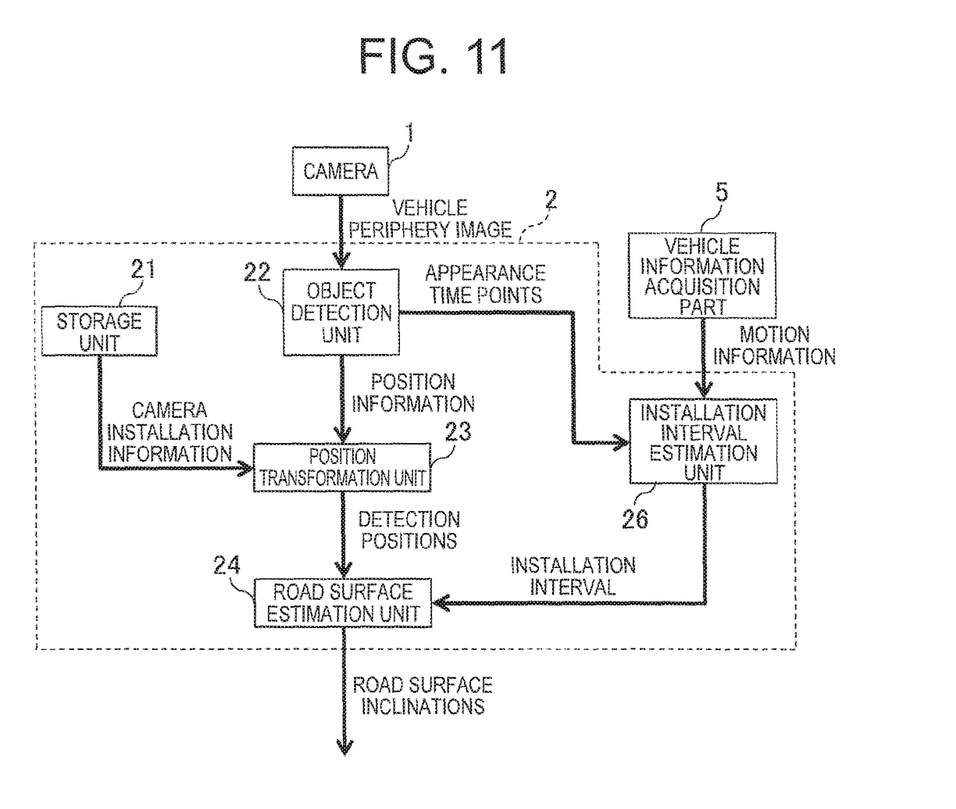
FIG. 11 is a configuration diagram for illustrating a road surface undulation estimation device according to a third embodiment of the present invention.

FIG. 11 is a configuration diagram for illustrating the road surface undulation estimation device 2 according to the third embodiment of the present invention. In FIG. 11, the road surface undulation estimation device 2 includes the storage unit 21, the object detection unit 22, the position transformation unit 23, the road surface estimation unit 24, and an installation interval estimation unit 26. Moreover, motion information is input to the road undulation estimation device 2 from a vehicle information acquisition unit 5.

The vehicle information acquisition unit 5 is configured to acquire the motion information on the vehicle such as the vehicle speed and the yaw rate, and output the acquired motion information to the installation interval estimation unit 26. The vehicle information acquisition unit 5 is constructed, for example, by a vehicle speed sensor and a yaw rate sensor.

The object detection unit 22 is configured to extract regularly appearing objects having the characteristic of the appearing repeatedly from the vehicle periphery image captured by the camera 1, sequentially acquire, from the temporal change in the vehicle periphery image captured by the camera 1, appearance time points at which the respective regularly appearing objects appear at a reference position, and output the appearance time points to the installation interval estimation unit 26.

The installation interval estimation unit 26 is configured to acquire the motion information from the vehicle information acquisition unit 5. Moreover, the installation interval estimation unit 26 is configured to use the respective appearance time points input from the object detection unit 22, and the motion information corresponding to the respective appearance time points to calculate the interval of the regularly appearing objects. The installation interval estimation unit 26 is configured to output the calculated and estimated installation interval to the road surface estimation unit 24. The road surface estimation unit 24 is configured to use the installation interval input from the installation interval estimation unit 26 to estimate the inclination of the road surface, which is different from the first embodiment.

Figure 12:
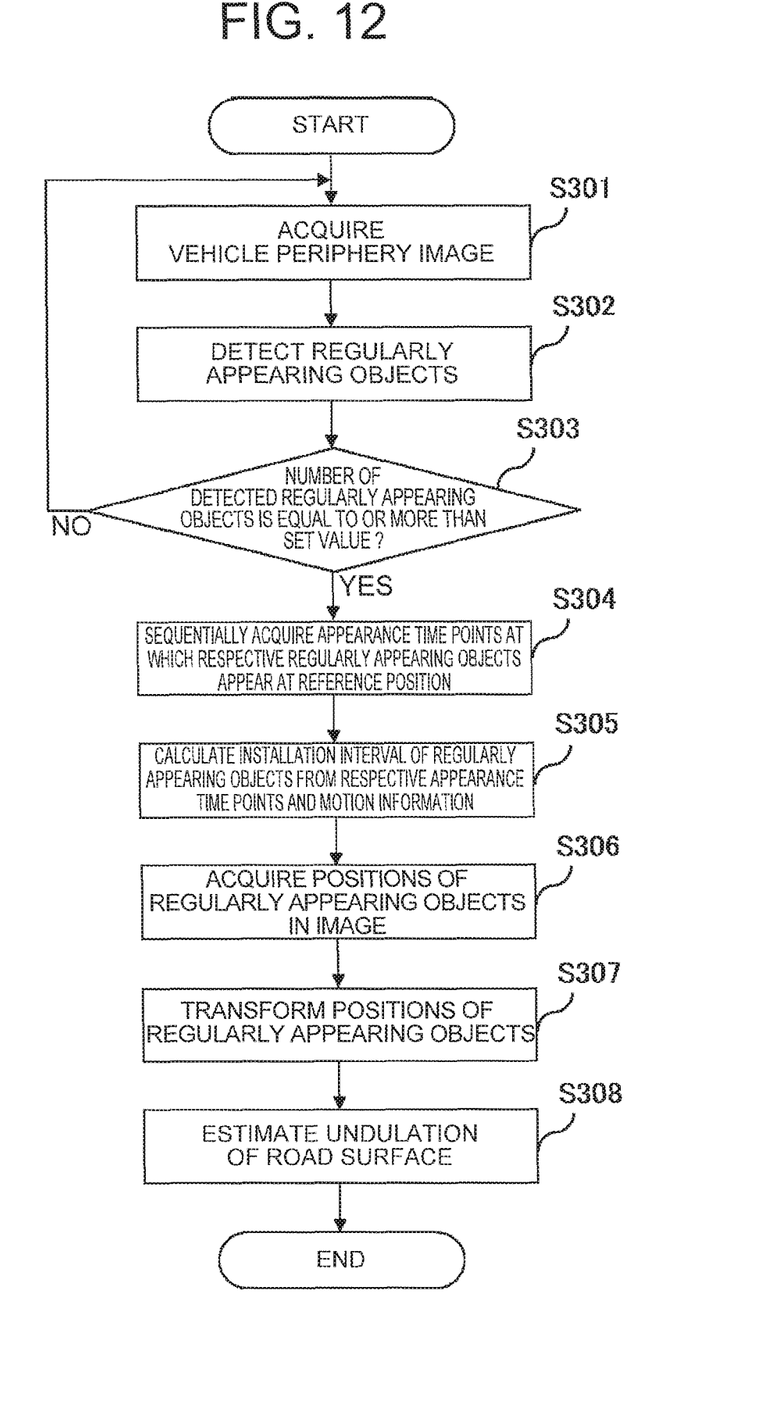
FIG. 12 is a flowchart for illustrating a series of operations of the road surface undulation estimation device of FIG. 11.
Figure 13:
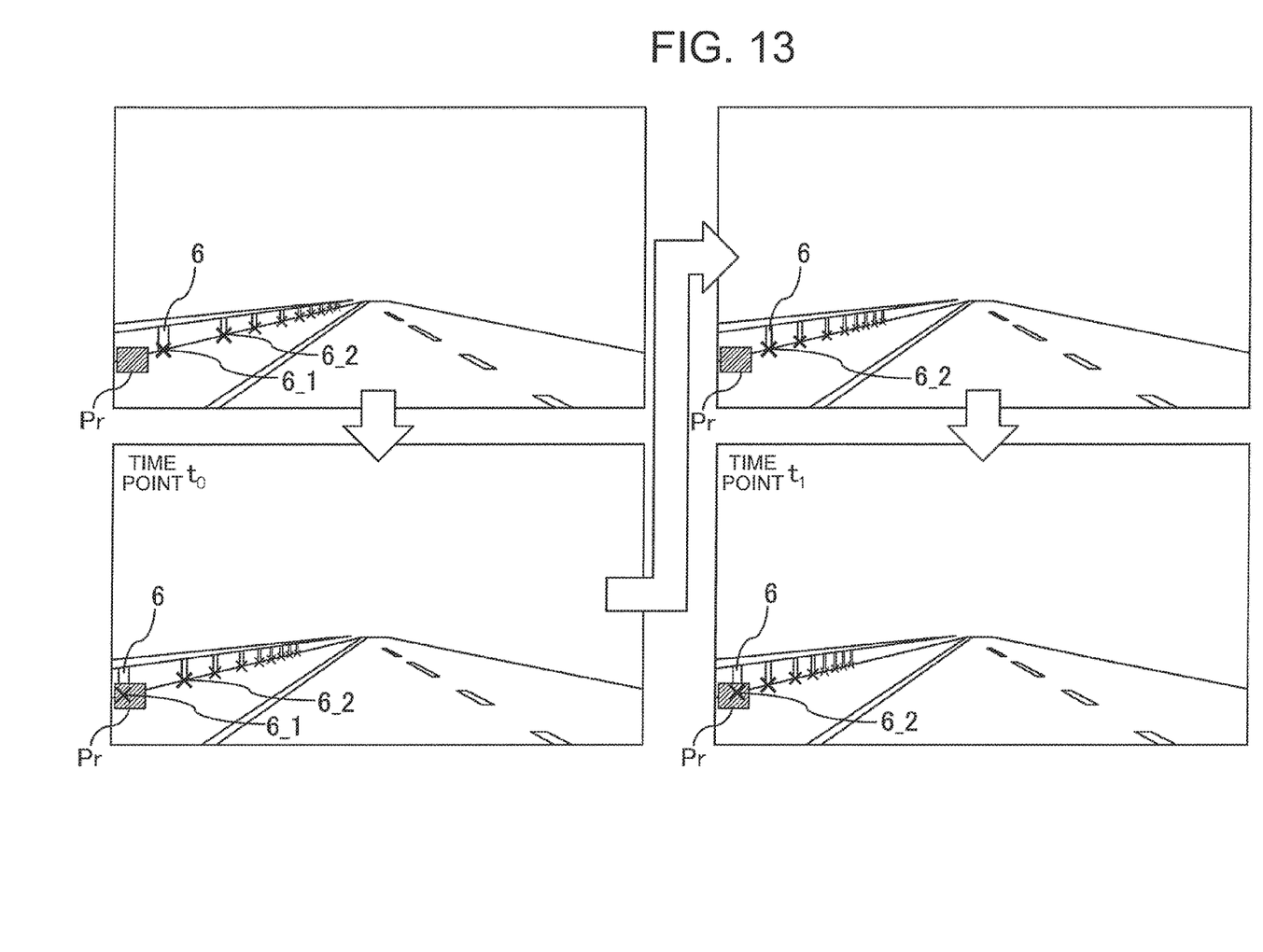
FIG. 13 is an explanatory diagram for illustrating a method of sequentially acquiring appearance time points at which the respective regularly appearing objects appear at a reference position from a temporal change in the vehicle periphery image by the object detection unit of FIG. 11.
Figure 14:
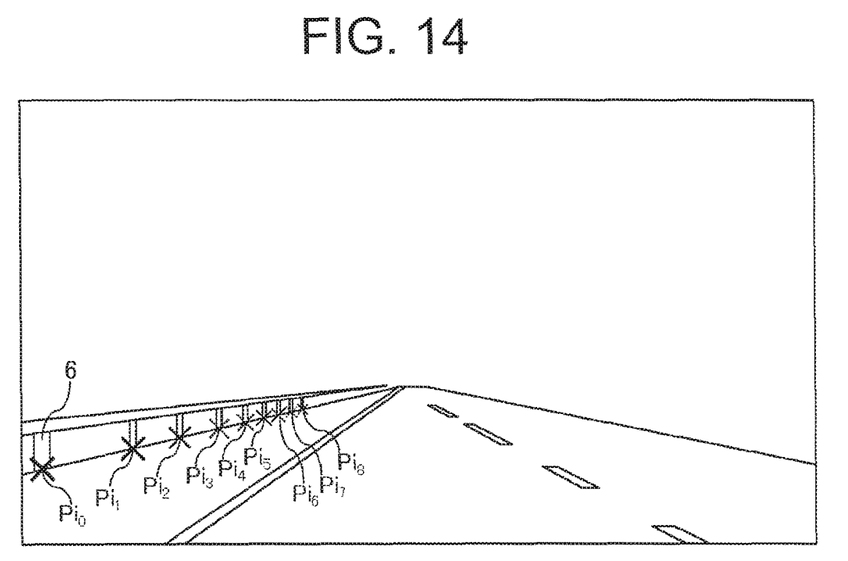
FIG. 14 is an explanatory diagram for illustrating an example of an operation of the object detection unit of FIG. 11 of detecting respective regularly appearing objects from the vehicle periphery image.

Referring to FIG. 12 to FIG. 14, a description is now given of a series of operations of the road surface undulation estimation device 2 according to the third embodiment. FIG. 12 is a flowchart for illustrating the series of operations of the road surface undulation estimation device 2 of FIG. 11. FIG. 13 is an explanatory diagram for illustrating a method of sequentially acquiring appearance time points at which the respective regularly appearing objects appear at a reference position Pr from a temporal change in the vehicle periphery image by the object detection unit 22 of FIG. 11. FIG. 14 is an explanatory diagram for illustrating an example of an operation of the object detection unit 22 of FIG. 11 of detecting the respective regularly appearing objects from the vehicle periphery image.

Processing of the flowchart of FIG. 12 is repeatedly carried out, for example, at a processing cycle set in advance. Moreover, it is assumed here that the regularly appearing object is a post 6 of a guard rail. In this case, the object detection unit 22 is set to detect a position at which the post 6 and the road surface contact with each other as the position of each of the respective posts 6 in the image.

As illustrated in FIG. 12, the object detection unit 22 carries out Steps S301 to S303, which are the same processing as Steps S101 to S103 of FIG. 2.

In Step S304, the object detection unit 22 sequentially acquires, from the temporal change in the vehicle periphery image captured by the camera 1, the appearance time points at which the respective regularly appearing objects appear at the reference position set in advance.

For example, a case is considered in which the temporal change in the vehicle periphery image captured by the camera 1 is states illustrated in FIG. 13. In FIG. 13, for the sake of easier understanding, two posts 6 are denoted by 6_1 and 6_2 in an ascending order starting from the post 6 closest to the reference position Pr.

In FIG. 13, the object detection unit 22 acquires, from the temporal change in the vehicle periphery image captured by the camera 1, an appearance time point $t_0$ when the post 6 appears at the reference position Pr for the first time, that is, when the first post 6_1 appears at the reference position Pr. Moreover, the object detection unit 22 outputs the acquired appearance time point $t_0$ to the installation interval estimation unit 26.

Next, the object detection unit 22 acquires, from the temporal change in the vehicle periphery image captured by the camera 1, an appearance time point $t_1$ when the second post 6_2 appears at the reference position Pr. Moreover, the object detection unit 22 outputs the acquired appearance time point $t_1$ to the installation interval estimation unit 26.

In this way, the object detection unit 22 sequentially acquires, from the temporal change in the vehicle periphery image captured by the camera 1, the appearance time points at which the respective regularly appearing objects appear at the reference position. When the number of the appearance time points acquired by the object detection unit 22 is represented by j, j only needs to be set in advance so as to satisfy j≥2.

Referring again to FIG. 12, in Step S305, the installation interval estimation unit 26 calculates, from the respective appearance time points input from the object detection unit 22 and the motion information corresponding to the respective appearance time points, the installation interval b of the regularly appearing objects.

Specifically, the installation interval estimation unit 26 calculates time intervals $\Delta t_1$ (=$t_1-t_0$), ..., $\Delta t_j$ (=$t_{j-1}-t_{j-2}$) each between appearance time points next to each other in a time series of the respective appearance time points $t_0, t_1, \ldots, t_{j-1}$. The installation interval estimation unit 26 calculates, from the motion information corresponding to the respective appearance time points $t_0$ to $t_{j-1}$ input from the object detection unit 22, respective distances over which the vehicle travels in the respective time intervals $\Delta t_1$ to $\Delta t_j$. Then, the installation interval estimation unit 26 calculates, from the distances corresponding to the respective calculated time intervals $\Delta t_1$ to $\Delta t_j$, the installation interval b. For example, the average of the distances corresponding to the respective calculated time intervals $\Delta t_1$ to $\Delta t_j$ may be set to the installation interval b.

The object detection unit 22 carries out Step S306, which is the same processing as Step S105 of FIG. 2, and the processing proceeds to Step S307.

The position transformation unit 23 carries out Step S307, which is the same processing as Step S106 of FIG. 2, and the processing proceeds to Step S308.

In Step S308, the road surface estimation unit 24 calculates, from the detection positions $Pd_0, Pd_1, \ldots, Pd_{k-1}$ of the respective regularly appearing objects input from the position transformation unit 23, the detection intervals $a_0, a_1, \ldots, a_{k-2}$ of the respective regularly appearing objects. Subsequently, the road surface estimation unit 24 estimates the inclinations $\theta_0, \theta_1, \ldots, \theta_{k-2}$ of the road surface from the detection positions $Pd_0, Pd_1, \ldots, Pd_{k-1}$ of the respective regularly appearing objects input from the position transformation unit 23, the calculated detection intervals $a_0, a_1, \ldots, a_{k-2}$ of the respective regularly appearing objects, and the installation interval b acquired from the installation interval estimation unit 26. Then, the series of processing is finished. The road surface estimation unit 24 calculates the inclinations $\theta_0$ to $\theta_{k-2}$ of the road surface through the calculation method described in the first embodiment, that is, the calculation method illustrated in FIG. 5 to FIG. 7.

Now, a case is considered in which the vehicle periphery image captured by the camera 1 presents a state illustrated in FIG. 14. In this case, k=9, and, in Step S306, the object detection unit 22 acquires positions $Pi_0$ to $Pi_8$ of the respective posts 6 in the image.

In Step S307, the position transformation unit 23 transforms the positions $Pi_0$ to $Pi_8$ of the respective posts 6 in the image into detection positions $Pd_0$ to $Pd_8$ of the respective posts 6. In Step S308, the road surface estimation unit 24 estimates inclinations $\theta_0$ to $\theta_7$ of the road surface from the detection positions $Pd_0$ to $Pd_8$ of the respective posts 6, detection intervals $a_0$ to $a_7$ of the respective posts 6, and the installation interval b acquired from the installation interval estimation unit 26.

Thus, according to the third embodiment, the regularly appearing objects whose installation interval is unknown and that has the characteristic of appearing repeatedly is used, the appearance time points at which the respective regularly appearing objects appear at the reference position in the image are sequentially acquired from the temporal change in the vehicle periphery image captured by the camera, and the installation interval is calculated from the respective appearance time points and the motion information corresponding to the respective appearance time points.

As a result, the same effects as those of the first embodiment are acquired, and even when the installation interval, which is known in the first embodiment, is not known, the undulation of the road surface can be estimated.

Note that, a description has been given individually of the first to third embodiments, but the configuration examples disclosed in the first to third embodiments may be arbitrarily combined with one another. Moreover, the method of acquiring the installation interval of the regularly appearing objects is described in each of the first to third embodiments, but the method is not limited to those methods. The installation interval may be acquired by any method other than the method of acquiring the detection interval by using the vehicle periphery image.

Note that, by applying the present invention to a decrease in the distance measurement performance of the camera for the object detection, which may be caused by the undulation of the road surface in the real environment, to estimate the undulation of the road surface during the vehicle travel, during which the undulation of the road surface is not always constant, and to use the estimation result for the distance measurement, inhibition of the decrease in the performance can be expected.

Moreover, the present invention enables the undulation of the lane on which the vehicle travels to be detected in advance, and thus an application of the present invention to a control technology for the active suspension can be expected. Further, the present invention enables a sag (recess), which may cause generation of a spontaneous traffic congestion on an expressway, to be detected in advance, and thus an application of the present invention to, for example, a technology of arousing attention of the driver to the speed can be expected.

What is claimed is:
1. A road surface undulation estimation device, which is configured to input a vehicle periphery image captured by a camera to capture an image of a periphery of the vehicle, the road surface undulation estimation device comprising:
  a storage to store camera installation information in advance;
  an object detector to detect regularly appearing objects installed at a constant installation interval on a road surface from the vehicle periphery image captured by the camera, calculate positions of the respective detected regularly appearing objects in the vehicle periphery image, and output a result of the calculated positions as position information;
  a position transformer configured to transform, based on the position information input from the object detector and the camera installation information input from the storage, the positions of the respective regularly appearing objects in the vehicle periphery image into positions of the respective regularly appearing objects in a real space, and output a result of the transformed positions as detection positions of the respective regularly appearing objects; and a road surface estimator to obtain a plurality of first straight lines passing through a lens center of the camera and the respective detection positions, obtain a second straight line that intersects with each of the plurality of first straight lines at the installation interval of the regularly appearing objects, determine the second straight line as an actual road surface, calculate respective detection intervals between neighboring detection positions of the respective detection positions input from the position transformer, determine a third straight line connecting the respective detection positions as a detected road surface, and determine an inclination angle between the actual road surface and the detected road surface, wherein the object detector, the position transformer, and the road surface estimator are included in one or more computing units.

2. The road surface undulation estimation device according to claim 1, wherein:
the storage is configured to further pre-store the constant installation interval; and
the constant installation interval pre-stored in the storage is input to the road surface estimator.

3. The road surface undulation estimation device according to claim 1, wherein:
the regularly appearing object is configured to display a numerical value representing a distance;
the road surface undulation estimation device further comprises an installation interval acquirer configured to detect the regularly appearing objects from the vehicle periphery image captured by the camera, and recognize the numerical values displayed on the respective detected regularly appearing objects, to thereby calculate the constant installation interval; and
the constant installation interval calculated by the installation interval acquirer is input to the road surface estimator.

4. The road surface undulation estimation device according to claim 1, wherein:
each of the regularly appearing objects has a characteristic of appearing repeatedly;
the object detector is configured to sequentially acquire, from a temporal change in the vehicle periphery image captured by the camera, appearance time points at which the respective regularly appearing objects appear at a reference position in the vehicle periphery image, and further output an acquisition result;
the road surface undulation estimation device further comprises an installation interval estimator to acquire motion information on the vehicle from a vehicle information acquirer configured to acquire the motion information, and calculate the constant installation interval from the respective appearance time points input from the object detector and the motion information corresponding to the respective appearance time points; and
the constant installation interval calculated by the installation interval estimator is input to the road surface estimator.

5. The road surface undulation estimation device according to claim 4, wherein the installation interval estimator is configured to calculate time intervals each between appearance time points next to each other in a time series of the respective appearance time points input from the object detector, calculate, from the motion information corresponding to the respective appearance time points, distances over which the vehicle travels in the respective calculated time intervals, and calculate the constant installation interval from the distances corresponding to the respective calculated time intervals.

6. A road surface undulation estimation method comprising:
an object detection step of detecting regularly appearing objects installed at a constant installation interval on a road surface from a vehicle periphery image captured by a camera to capture an image of a periphery of a vehicle, calculating positions of the respective detected regularly appearing objects in the vehicle periphery image, and outputting a result of the calculated positions as position information;
a position transformation step of transforming, based on the position information output in the object detection step and camera installation information acquired in advance, the positions of the respective regularly appearing objects in the vehicle periphery image into positions of the respective regularly appearing objects in a real space, and outputting a result of the transformed positions as detection positions of the respective regularly appearing objects; and
a road surface estimation step of obtaining a plurality of first straight lines passing through a lens center of the camera and the respective detection positions, obtaining a second straight line that intersects with each of the plurality of first straight lines at the installation interval of the regularly appearing objects, determining the second straight line as an actual road surface, calculating respective detection intervals between neighboring detection positions of the respective detection positions output in the position transformation step, determining a third straight line connecting the respective detection positions as a detected road surface, and determining an inclination angle between the actual road surface and the detected road surface obtained through the transformation calculation in the position transformation step.

7. The road surface undulation estimation device according to claim 1, wherein the positions of the respective detected regularly appearing objects in the vehicle periphery image comprises a first actual position and a second actual position, and the neighboring detection positions of the respective detection positions comprises a first detection position and a second detection position,
the first actual position is equal to the first detection position, a first line connects the first actual position and the second actual position, a second line connects the first detection position and the second detection position, and a third line connects the first detection position and the first actual position, and
wherein the road surface estimator determines the inclination angle based on an angle between the first line and the third line and an angle between the second line and the third line.

* * * * *